United States Patent
Kovach et al.

(10) Patent No.: US 10,178,823 B2
(45) Date of Patent: Jan. 15, 2019

(54) AGRICULTURAL IMPLEMENT WITH AUTOMATIC SHANK DEPTH CONTROL

(71) Applicant: CNH Industrial Canada, Ltd., Saskatoon (CA)

(72) Inventors: Michael G. Kovach, Morton, IL (US); Christopher Barrick, Morton, IL (US); James W. Henry, Saskatoon (CA); Tracey D. Meiners, Mackinaw, IL (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 58 days.

(21) Appl. No.: 15/375,993

(22) Filed: Dec. 12, 2016

(65) Prior Publication Data
US 2018/0160613 A1    Jun. 14, 2018

(51) Int. Cl.
*A01B 63/114*    (2006.01)
*A01B 63/28*    (2006.01)

(52) U.S. Cl.
CPC ............ *A01B 63/114* (2013.01); *A01B 63/28* (2013.01)

(58) Field of Classification Search
CPC ..... A01B 63/114; A01B 63/00; A01B 63/002; A01B 63/28; A01B 63/112
USPC .................................................. 172/2, 4, 8
See application file for complete search history.

(56) References Cited

U.S. PATENT DOCUMENTS

| | | | |
|---|---|---|---|
| 3,396,803 A | 8/1968 | Corni | |
| 3,658,133 A | 4/1972 | Sweet et al. | |
| 4,031,963 A | 6/1977 | Poggemiller et al. | |
| 4,044,838 A | 8/1977 | Woolridge | |
| 5,841,282 A | 11/1998 | Christy et al. | |
| 6,164,223 A | 12/2000 | Eriksson | |
| 6,647,799 B1 * | 11/2003 | Raper | E02D 1/022 73/73 |
| 7,028,554 B2 * | 4/2006 | Adamchuk | G01N 33/24 73/784 |
| 7,104,340 B1 * | 9/2006 | Thompson | A01B 59/042 172/677 |
| 8,573,319 B1 * | 11/2013 | Casper | A01B 63/114 172/4 |
| 8,827,001 B2 * | 9/2014 | Wendte | A01B 63/008 172/4 |
| 8,849,523 B1 | 9/2014 | Chan et al. | |

(Continued)

FOREIGN PATENT DOCUMENTS

WO    2015/171908 A1    11/2015

*Primary Examiner* — Jessica H Lutz
(74) *Attorney, Agent, or Firm* — Rebecca L. Henkel; Rickard K. DeMille

(57) ABSTRACT

An agricultural implement includes a chassis; an implement frame carried by the chassis; a shank connected to the implement frame, the shank including a shank point configured to break apart soil and a load sensor associated with the shank point which is configured to output shank load signals as the shank point advances through soil; an actuator carried by the chassis and configured to adjust a depth of the shank point; and a controller electrically coupled to the load sensor and the actuator. The controller is configured to receive the shank load signals; generate a load profile from the received shank load signals; analyze the load profile to determine whether the shank point is in a soil compaction layer; and activate the actuator to adjust the depth of the shank point based on the analyzed load profile.

14 Claims, 7 Drawing Sheets

(56) References Cited

U.S. PATENT DOCUMENTS

| | | |
|---|---|---|
| 8,943,788 B2 | 2/2015 | Miller et al. |
| 9,215,837 B2 | 12/2015 | Adams et al. |
| 2003/0016029 A1 | 1/2003 | Schuler et al. |
| 2003/0066357 A1* | 4/2003 | Upadhyaya .......... A01B 79/005 73/818 |
| 2015/0305226 A1 | 10/2015 | Zemenchik |

* cited by examiner

AGRICULTURAL IMPLEMENT WITH AUTOMATIC SHANK DEPTH CONTROL

BACKGROUND OF THE INVENTION

1. Field of the Invention

The present invention relates to agricultural implements, and, more particularly, to agricultural implements equipped with shanks.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Tillage equipment prepares the soil by way of mechanical agitation of various types, such as digging, stirring, and overturning (lift, twist, and roll). Examples of which include plowing (overturning with moldboards or chiseling with chisel shanks), rototilling, rolling with cultipackers or other rollers, harrowing, and cultivating with cultivator shanks. Tillage is often classified into two types, primary and secondary. There is no strict definition of these two types, perhaps a loose distinction between the two is that tillage that is deeper and more thorough is thought of as primary, and tillage that is shallower is thought of as secondary. Primary tillage such as plowing produces a larger subsurface difference and tends to produce a rough surface finish, whereas secondary tillage tends to produce a smoother surface finish, such as that required to make a good seedbed for many crops. Harrowing and rototilling often combine primary and secondary tillage into one operation.

As is known, a field can have soil with multiple layers each having varying levels of density. The top layer of the field soil, typically, is loose and unpacked. A compaction layer, which is also commonly known as the "hardpan," can be formed below the top layer due to moisture and pressure compacting the soil into a relatively dense, packed layer that crop roots cannot penetrate. When the roots grow to a depth where the roots hit the compaction layer, the roots cannot grow any deeper in the soil and thus tend to spread out horizontally at the boundary between the unpacked soil and the top of the compaction layer. When the roots of many crops spread out at the boundary, the crop roots all compete for nutrients in a relatively limited volume of soil, decreasing yield.

For primary tillage, the desired depth of the shank point, which corresponds to the deepest portion of the shank, is below the compaction layer so the entire compaction layer is broken by the tillage implement advancing. Breaking up the compaction layer allows the crop roots in the field to grow deeper and access nutrients in lower levels of the soil while reducing competition amongst the crop roots. However, it is also desirable to not advance the shank point too deep below the compaction layer, as operating with a greater depth of the shank point increases the resistance of the soil to the implement advancing in the field. The increased resistance of the soil to the implement advancing requires greater fuel consumption and also unnecessarily increases the wear on the shank.

The traditional method farmers use to determine the lowest depth of the compaction layer, and thus how deep the shank point should be during tillage, is to dig a pit in the field and manually probe the soil at various depths to feel where the compaction layer exists. One particular problem with this method is that it is time-consuming and the compaction layer may not be uniform throughout a field, requiring the farmer to sample many locations throughout the field to determine where the compaction layer(s) exist and what the depths are at each location. One solution to the problems of this method is described by Wendte et al. in U.S. Pat. No. 8,827,001, which is incorporated herein by reference. Wendte et al. addressed the problems of the prior art by incorporating an auxiliary shank carrying a pressure sensor, with an actuator reciprocating the auxiliary shank and pressure sensor within the soil to find the compaction layer. The solution of Wendte et al. is effective to find the compaction layer, but requires the implement to carry the auxiliary shank through the soil which increases the resistance of the implement advancing through the field.

What is needed in the art is a way to adjust the depth of primary shanks of an agricultural implement below a compaction layer that overcomes some of the previously described disadvantages of known implements.

SUMMARY OF THE INVENTION

The present invention provides a load sensor associated with a shank point of a shank and a controller which generates and analyzes a load profile from signals output by the load sensor to control an actuator based on the analyzed load profile.

The invention in one form is directed to an agricultural implement including a chassis; an implement frame carried by the chassis; a shank connected to the implement frame, the shank including a shank point configured to break apart soil and a load sensor associated with the shank point which is configured to output shank load signals as the shank point advances through soil; an actuator carried by the chassis and configured to adjust a depth of the shank point; and a controller electrically coupled to the load sensor and the actuator. The controller is configured to receive the shank load signals; generate a load profile from the received shank load signals; analyze the load profile to determine whether the shank point is in a soil compaction layer; and activate the actuator to adjust the depth of the shank point based on the analyzed load profile.

The invention in another form is directed to a method for controlling a penetration depth of a shank point of an agricultural implement having a load sensor associated with the shank point, which includes: determining a resistive load applied to the shank point from shank load signals output by the load sensor as the agricultural implement travels; generating a load profile from the output shank load signals; analyzing the load profile to determine whether the shank point is in a soil compaction layer; and activating an actuator of the agricultural implement to adjust the penetration depth of the shank point based on the analyzed load profile.

An advantage of the present invention is the controller can determine the location of a soil compaction layer using information obtained from the shank point breaking apart the soil.

Another advantage is the controller can accurately determine the location of a soil compaction layer using additional inputs such as shank point depth.

Yet another advantage is the controller can obtain feedback from the shank point to accurately determine the soil breaking behavior of the shank point and adjust the depth of the shank point appropriately.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
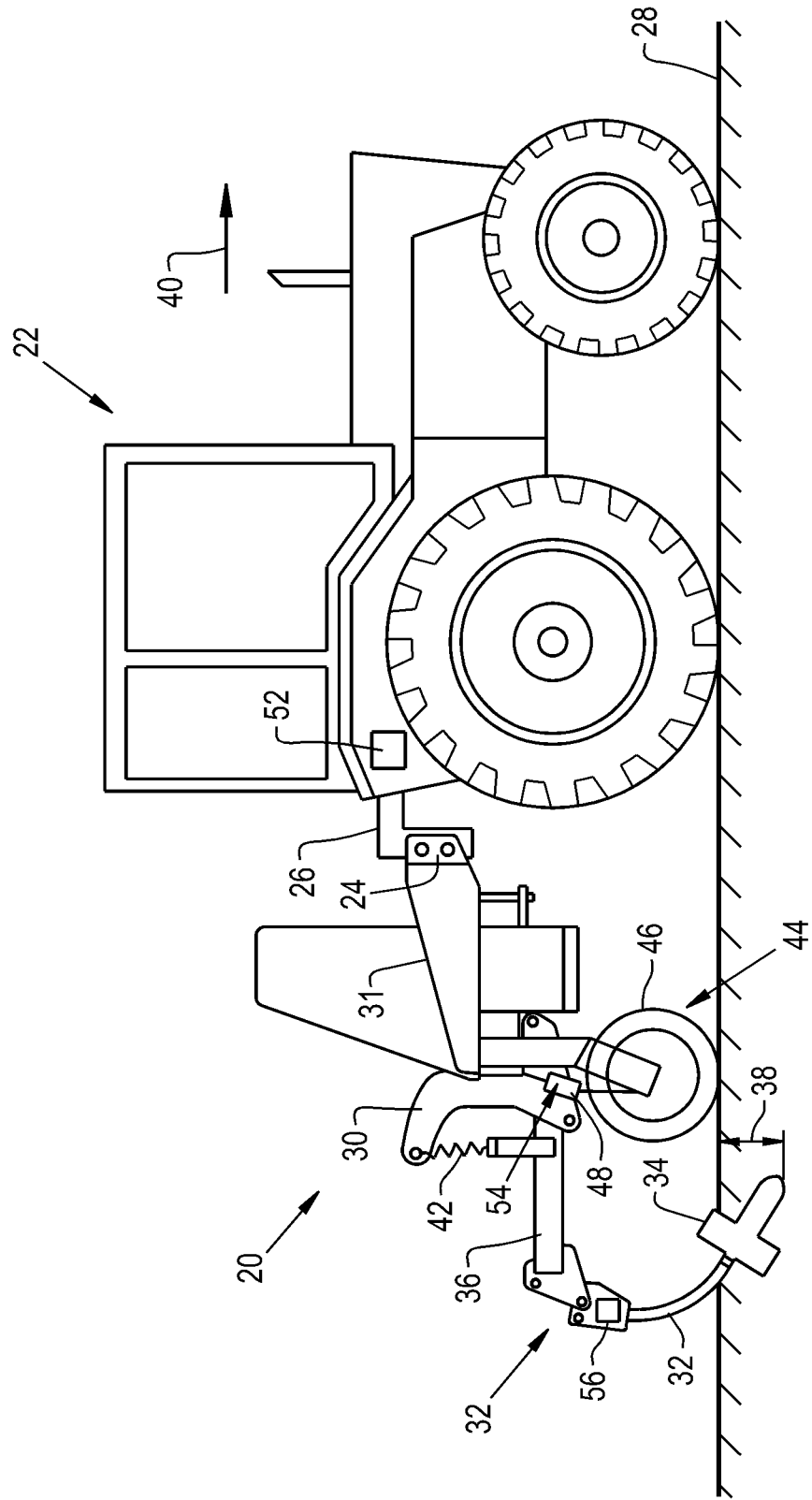
FIG. 1 is a side view of an embodiment of an agricultural implement formed according to the present invention.

Referring now to the drawings, and more particularly to FIG. 1, an embodiment of an agricultural implement 20 formed according to the present invention is shown. The implement 20 is designed to be towed behind a work vehicle, such as the illustrated tractor 22. In the illustrated embodiment, the implement 20 includes a hitch 24 configured to attach to an appropriate tractor hitch assembly 26. As discussed in detail below, the tractor hitch assembly 26 may be adjustable to enable an operator and/or an automated system to vary a height of the implement 20 relative to a soil surface 28 on which the tractor 22 and implement 20 are traveling. As illustrated, the hitch 24 is coupled to an implement frame 30 which is carried by a chassis 31 of the implement 20 and configured to support multiple ground engaging tools, such as the illustrated shank 32. In the illustrated embodiment, the shank 32 includes a shank point 34 configured to break apart soil and a support arm 36. The shank point 34 is configured to engage the soil at a desired penetration depth 38. In this configuration, the shank point 34 fractures the soil as the implement 20 is towed in a direction of travel 40, thereby substantially reducing or eliminating the compaction layer. The shank 32 is supported by the arm 36, which is rotatably coupled to the frame 30. In the illustrated embodiment, a compression spring 42 extends between the frame 30 and the arm 36. The spring 42 enables the shank 32 to retract if any portion of the shank 32 encounters an obstruction (e.g., a rock, tree root, etc.), thereby substantially reducing wear on the shank 32.

In certain embodiments, the penetration depth 38 of the shank point 34 may be adjusted as the implement 20 is pulled through the field, thereby enabling the shank point 34 to effectively engage a soil boundary just below the compaction layer. In such embodiments, the trailer hitch 26 may adjust a vertical position of the frame 30 relative to the tractor 22 to vary the penetration depth 38 of the shank point 34. In addition, as the height of the frame 30 above the soil surface 28 varies, a wheel assembly 44 may adjust a vertical position of a gauge wheel 46 relative to the frame 30, thereby enabling the wheel assembly 44 to support the frame 30 throughout the range of vertical frame movement. For example, in the illustrated embodiment, the wheel assembly 44 includes an actuator 48 configured to adjust the vertical position of the gauge wheel 46 relative to the frame 30. As will be appreciated, the actuator 48 may be a linear actuator, such as a hydraulic cylinder, a pneumatic cylinder, or an electromechanical actuator, or a rotary actuator, such as a hydraulic servo, or an electric servo. In this sense, the actuator 48 is configured to adjust the penetration depth 38 of the shank point 34 by adjusting the vertical position of the gauge wheel 46 relative to the frame 30, but it should be appreciated that a separate actuator can also be connected directly to the shank 32 and/or shank point 34 to adjust the penetration depth 38 of the shank point 34.

The shank 32 further includes a load sensor 50 associated with the shank point 34 that is configured to output shank load signals as the shank point 34 advances through soil. As used herein, the load sensor 50 is "associated with" the shank point 34 in the sense that the load sensor 50 can detect loads applied to the shank point 34 during travel of the implement 20 in the forward direction 40. Typically, the loads applied to the shank point 34 will be in the form of resistive loads created by friction between the shank point 34 and the soil being fractured by the shank point 34 as the implement 20 advances in the forward direction 40. The load sensor 50 can be, for example, a load pin, a load bolt, a strain gauge, or any other kind of construction suitable to detect loads applied to the shank point 34, and can be carried by the shank 32 above the soil surface 28. The shank load signals output by the load sensor 50 can, for example, correlate directly with the loads applied to the shank point 34, e.g., a magnitude of the voltage output by the load sensor 50 can increase and decrease proportionately to an increase and decrease in the measured load. It should be appreciated that other types of load sensors can be utilized, and the present invention is not restricted to any one particular embodiment of load sensor and output shank load signals.

The load sensor 50 is electrically coupled to a controller 52 which is also electrically coupled to the actuator 48 in order to control the penetration depth 38 of the shank point 34. As such, the controller 52 is configured to receive the output shank load signals from the load sensor 50 and control the actuator 48 based on the received output shank load signals, which is described further herein. The controller 52 can include, for example, an electrical processing circuit or central processing unit and memory that allow the controller 52 to send and receive electrical signals to control various components of the implement 20, such as the actuator 48. In the case of pneumatic or hydraulic cylinders, the controller 52 can control one or more valves (not shown) of the cylinder to fill or drain fluid from within the cylinder, as is known. It should be appreciated that other types of actuators can be used other than cylinders, such as electrically powered actuators, in which case the controller 52 will control the mechanism that causes extension and retraction of the actuator 48.

A depth sensor 54 can also be associated with the shank point 34 and configured to output point depth signals to the controller 52. As used herein, the depth sensor 54 is "associated with" the shank point 34 in the sense that the depth sensor 54 can output point depth signals that correlate with the penetration depth 38 of the shank point 34. For example, the depth sensor 54 can be a position sensor included as a part of the actuator 48 and configured to output point depth signals indicating the relative position of a piston (not shown) within the actuator 48, which indicates the degree of extension of the actuator 48 and thus correlates to the penetration depth 38 of the shank point 34. The output point depth signals can, for example, directly correlate with the penetration depth 38 of the shank point 34, e.g., a change in the voltage of the point depth signal can be directly proportional to a change in the penetration depth 38 of the shank point 34. It should be appreciated that the previously described depth sensor 54 is exemplary only, and any type of suitable depth sensor can be used that allows for the controller 52 to determine the penetration depth 38 of the shank point 34 during operation of the implement 20.

Optionally, a vibration sensor 56 can be associated with the shank point 34 and configured to output vibration signals to the controller 52. As used herein, the vibration sensor 56 is "associated with" the shank point 34 in the sense that the vibration sensor 56 can detect and quantify vibrations of the shank point 34 as the shank point 34 breaks apart soil during travel in the forward direction 40. The vibration sensor 56 can be configured to output vibration signals which are directly correlated to the amplitude and/or frequency of the vibrations of the shank point 34, e.g., the output vibration signals can have proportionate frequency and/or amplitude to the frequency and/or amplitude, respectively, of the vibrations of the shank point 34 which are detected by the vibration sensor 56. The vibration sensor 56 can be configured to measure the vibrations of the shank point 34 in the fore-to-aft direction (parallel to forward direction 40), the vibrations of the shank point 34 in the side-to-side direction (perpendicular to forward direction 40), and/or the vibrations of the shank point 34 in the vertical direction. It should be appreciated that the previously described vibration sensor 56 is exemplary only and any type of vibration sensor can be used that is suitable to detect the vibrations of the shank point 34 during operation of the implement 20.

To illustrate exemplary operation of the implement 20 according to the present invention, reference is made to FIGS. 2-5 illustrating the shank 32 and shank point 34 advancing through the soil of a field in the forward direction 40. As can be seen in FIGS. 2-5, the shank point 34 has penetrated the soil surface 28 to a penetration depth 38 which is defined between the soil surface 28 and the tip 66, which can define a deepest portion of the shank point 34. The deepest portion 66 of the shank point 34 defines the greatest depth of the soil that the shank point 34 fractures as the implement 20 advances in the forward direction 40 and the shank point 34 travels through the soil. Within the soil, there are non-compacted layers 58 and 60 where the soil is relatively unpacked and offers relatively low resistance to fracturing and a compaction layer 62 formed between the non-compacted layers 58 and 60. In this sense, the compaction layer 62 is sandwiched between the non-compacted layers 58 and 60 due to moisture and downward pressure on soil compacting the soil into the compaction layer 62, with a soil compaction boundary 64 formed between the bottom non-compacted layer 60 and the compaction layer 62. A top non-compacted depth NCD is defined between the soil surface 28 and a top of the compaction layer 62, and corresponds to how deep the shank point 34 must vertically travel in the soil to reach the compaction layer 62. The compaction layer 62, as can be seen, has a compaction thickness CT defined between a top and bottom of the compaction layer 62 which the deepest portion 66 of the shank point 34 must penetrate to completely fracture the compaction layer 62 and reach the soil compaction boundary 64 between the compaction layer 62 and the bottom non-compacted layer 60. Thus, to effectively fracture the entirety of the compaction layer 62, the deepest portion 66 of the shank point 34 must be at or below a compaction layer bottom depth CLD within the soil which is equal to the sum of the top non-compacted depth NCD and the compaction thickness CT. It should be appreciated that the compaction thickness CT and compaction layer bottom depth CLD of a field will depend on many variables, including the amount of recent rainfall, previous tillage activity, any thawing that occurs in the field, soil composition, etc. It should therefore be appreciated that the teachings of the present invention can be applied to take into account the various factors affecting the compaction thickness CT and compaction layer bottom depth CLD.

The soil compaction boundary 64, due to the nature of how the compaction layer 62 is formed, may be slightly more or as compacted as the non-compacted layers 58 and 60, but is still significantly less compacted than the compaction layer 62. For example, the soil compaction boundary 64 can have a boundary thickness BT which is about 0.5" to 1.5" below the bottom of the compaction layer 62, with the soil in the bottom non-compacted layer 60 below the soil compaction boundary 64 having similar compaction compared to the top non-compacted layer 58.

Due to the differences in soil compaction between the non-compacted layers 58, 60, the compaction layer 62, and the soil compaction boundary 64, the resistance to the movement of the shank point 34 through the soil, which is measured by the load sensor 50, will vary depending on which layer(s) 58, 60, 62, 64 the shank point 34 is travelling through as the implement 20 advances. Since the shank point 34 has a specific surface area that is traveling through the soil, the total resistance to the movement of the shank point 34 through the soil is mostly affected by the speed of the shank point 34 through the soil and the sum total resistance effects of the layers 58, 60, 62, 64 on the shank point 34. Accounting for the fact that all portions of the shank point 34 should be traveling through the soil at substantially the same speed, the resistance applied to the shank point 34 by the layer(s) 58, 60, 62, 64 is correlated to the amount of surface area of the shank point 34 traveling in the forward direction 40 through each layer 58, 60, 62, 64 multiplied by the resistance value of each layer 58, 60, 62, 64.

Figure 2:
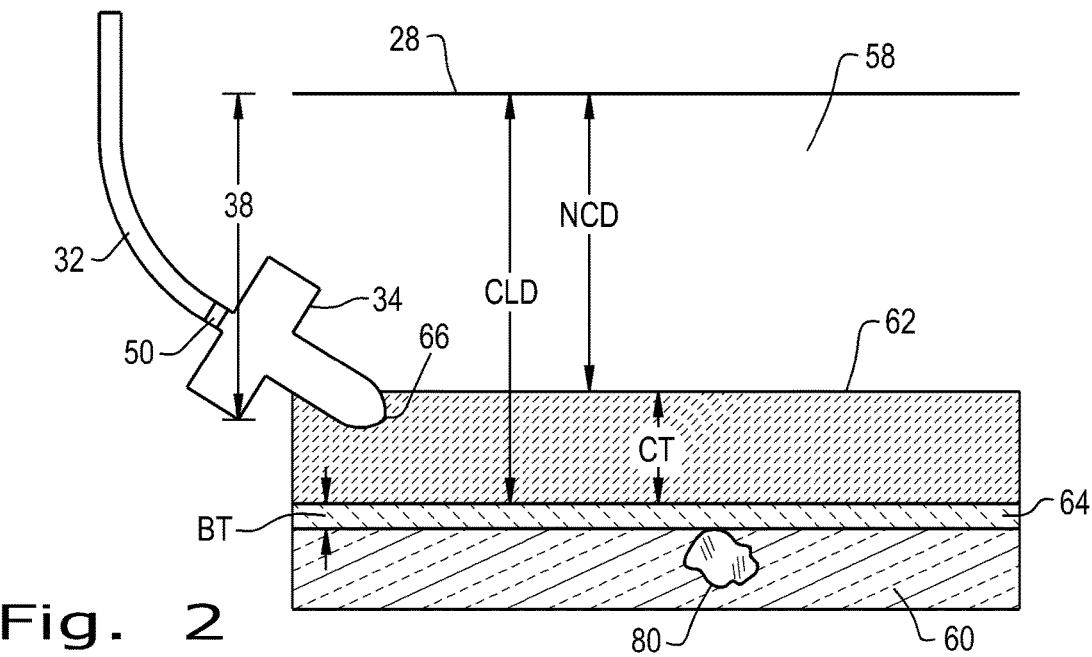
FIG. 2 is a side view of a shank tilling soil of a field, the view being from within the soil.
Figure 3:
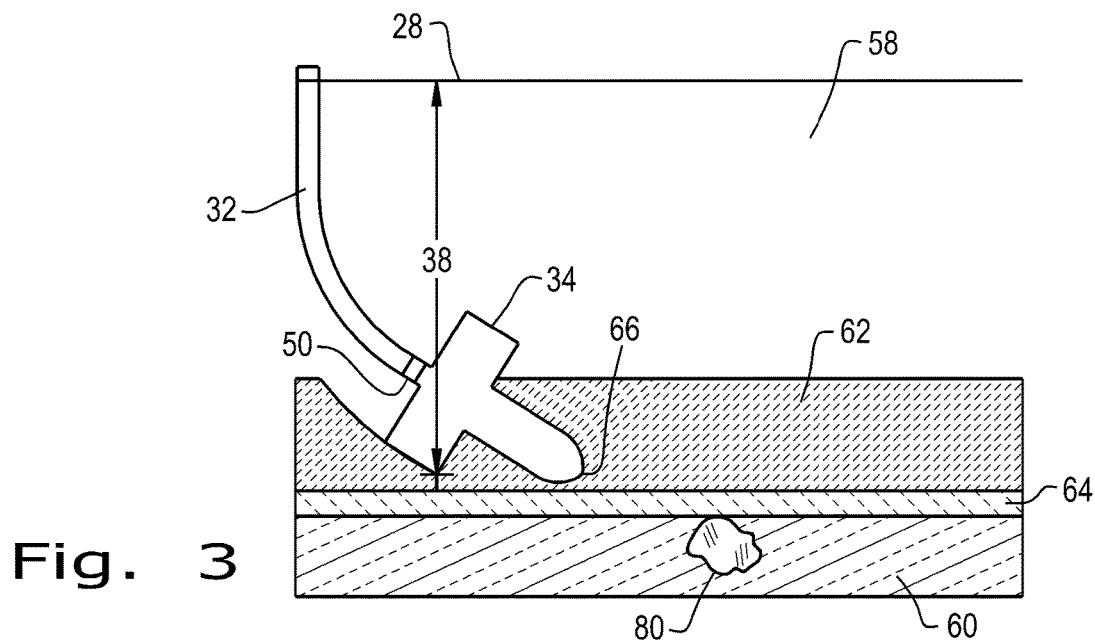
FIG. 3 is a side view of the shank shown in FIG. 2 at another depth of the soil.

For example, in FIG. 2 it is shown that most of the shank point 34 is traveling through the top non-compacted layer 58, with only a tip 66 of the shank point 34 having penetrated the compaction layer 62. As such, the load sensed by the load sensor 50, correlating to the resistance to the travel of the shank point 34, will be mostly due to the resistance applied to the shank point 34 by the non-compacted layer 58, with only a small part of the resistance being attributable to movement of the shank point 34 through the compaction layer 62. Since the shank point 34 is mostly traveling through the top non-compacted layer 58, the deepest portion 66 of the shank point 34 has not penetrated below the compaction layer 62, so the shank point 34 will not fracture the entire compaction thickness CT of the compaction layer 62 as the implement 20 travels in the forward direction 40, which is undesirable.

Figure 4:
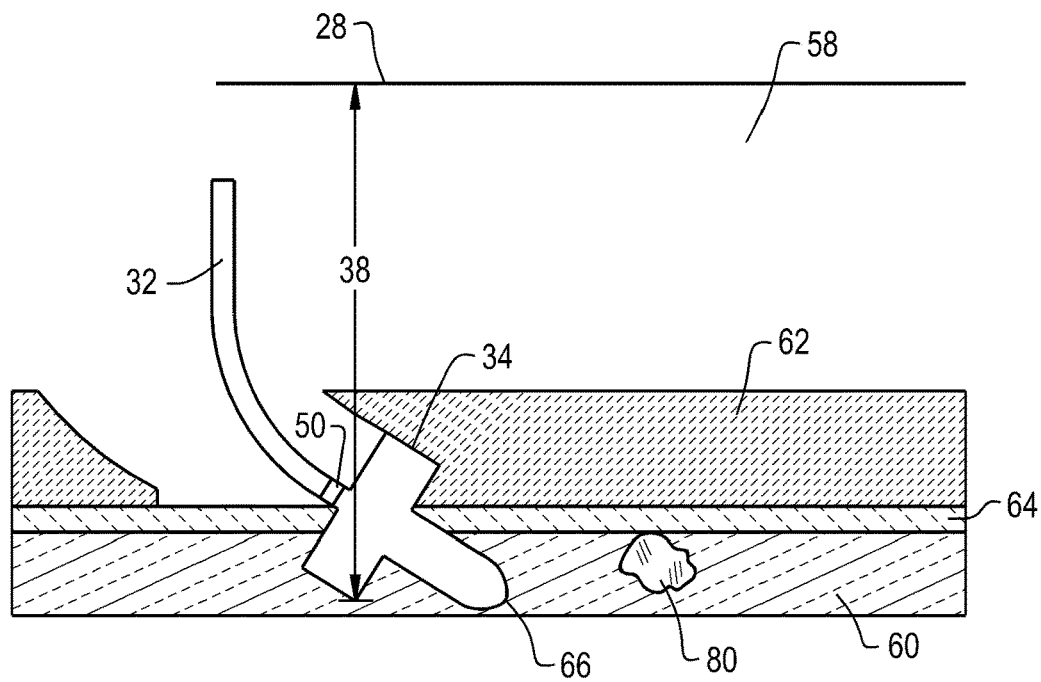
FIG. 4 is a side view of the shank shown in FIGS. 2-3 at yet another depth of the soil.
Figure 5:
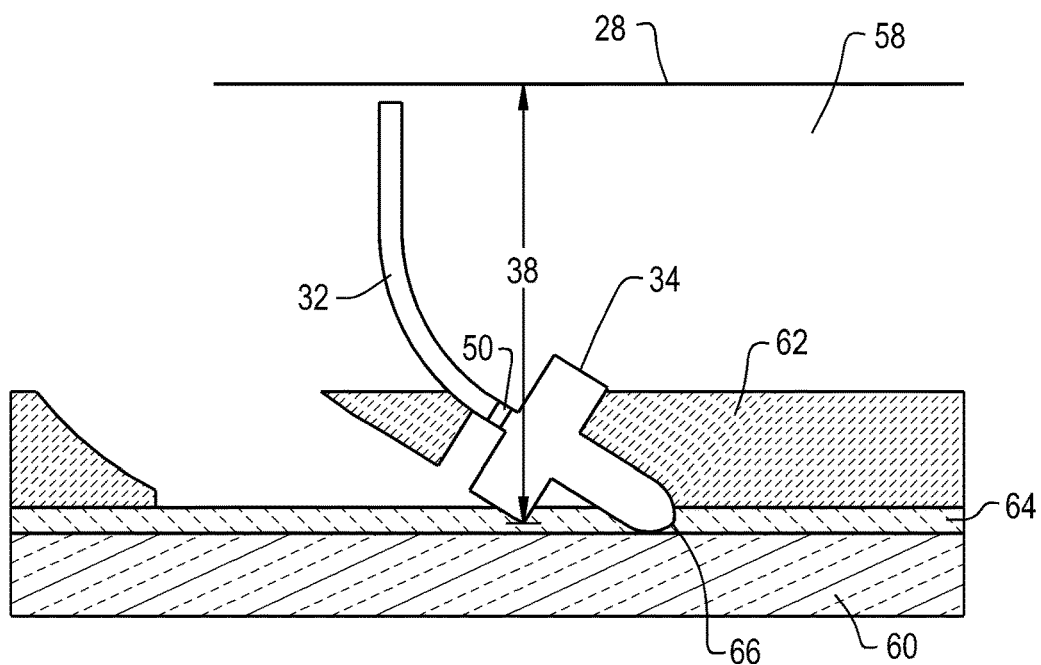
FIG. 5 is a side view of the shank shown in FIGS. 2-4 at yet another depth of the soil.
Figure 6:
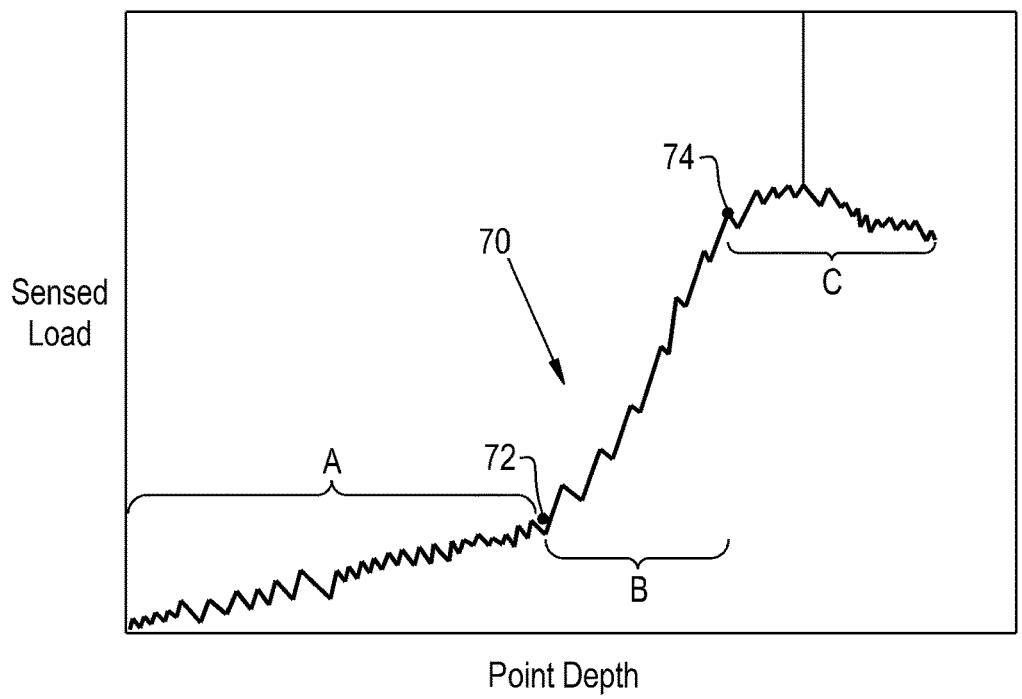
FIG. 6 is a chart illustrating raw data of sensed load as a function of point depth.

To fracture the entire compaction thickness CT of the compaction layer 62, and referring now to FIG. 6, the controller 52 is configured to receive shank load signals from the load sensor 50, corresponding to the resistance applied by the soil layers 58, 60, 62, 64 on the shank point 34, and generate a load profile 70 from the received shank load signals, with one exemplary load profile 70 being shown in FIG. 6 for the movement of the shank point 34 shown in FIGS. 2-5. It should be appreciated that while the load profile 70 shown in FIG. 6 is generated as sensed load as a function of penetration depth 38, which the controller 52 can determine based on received depth signals from the depth sensor 54, the load profile 70 can be generated by the controller 52 based solely on the received shank load signals from the load sensor 50. For example, the controller 52 can have a first load threshold, shown as point 72, which is stored therein or in a memory (not shown) thereof which correlates to the load sensed by the load sensor 50 when the shank point 34 is entirely in non-compacted soil. In this sense, point 72 can represent a threshold non-compacted soil value of the sensed load, with any load applied to the shank point 34 above the threshold non-compacted soil value 72 indicating that the shank point 34 is at least partially traveling through a non-compacted soil layer 58 or 60. Up until the load sensor 50 outputs a shank load signal to the controller 52 that exceeds the threshold non-compacted soil value 72, the controller 52 can be configured to activate the actuator 48 to increase the penetration depth 38 of the shank point 34. The controller 52 can be configured to activate the actuator 48 to increase the penetration depth 38 of the shank point 34 until the received shank load signals reach a second load threshold, shown as point 74, which correlates to a known load that the shank point 34 will experience when the shank point 34 fractures the entire compaction thickness CT of the compaction layer 62. Once the shank point 34 is fracturing the entire compaction layer 62, indicated by the received shank load signals reaching the second load threshold 74, the controller 52 can be configured to discontinue activation of the actuator 48 shortly thereafter, leaving the deepest portion 66 of the shank point 34 in the soil compaction boundary 64 below the compaction layer 62.

It should therefore be appreciated how the controller 52 can be configured to generate a load profile 70 from only received shank load signals output by the load sensor 50, analyze the load profile 70 to determine whether the shank point 34 is in the soil compaction layer 62 based on the load values, and activate the actuator 48 so the deepest portion 66 of the shank point 34 resides in the soil compaction boundary 64 below the compaction layer 62 when the received shank load signals reach the second load threshold 74. Such a configuration is simple and convenient, but also requires that the controller 52 have the first load threshold 72 and second load threshold 74 stored therein prior to operation of the implement 20. This may be inconvenient for a user to determine and also change from season to season, requiring constant reconfiguring.

To fracture the entire compaction thickness CT of the compaction layer 62 without needing preconfigured load threshold values 72 and 74, and referring to FIGS. 2-8, the controller 52 can also be configured to receive point depth signals from the depth sensor 54 and generate the load profile 70 from the shank load signals as a function of the point depth signals, as illustrated. In other words, the controller 52 can be configured to generate the load profile 70 as resistive loads applied to the shank point 34 as a function of the penetration depth 38 of the shank point 34. The portion of the load profile 70 corresponding to FIG. 2, which is designated as region A in FIG. 6, shows that the shank point 34 is mostly traveling through the non-compacted layer 58, as the change in resistive load applied to the shank point 34 as a function of the penetration depth 38 is relatively low, i.e., increases at a non-compacted soil rate. The non-compacted soil rate can be determined by the controller 52 beforehand by operating with the shank point 34 just entirely below the soil surface 28 or can be preloaded into the controller 52 from known values. When the shank point 34 is entirely within the non-compacted soil layer 58 and going deeper into the non-compacted soil layer 58, for example, the rate of change of the resistive load as a function of the penetration depth might be constant, indicating that the shank point 34 is traveling through soil with a relatively similar resistive value as the penetration depth 38 increases. As the penetration depth 38 of the shank point 34 increases to the depth shown in FIG. 3, the rate of change of the resistive load as a function of the penetration depth increases due to the shank point 34 traveling through the dense compaction layer 62 and encountering more resistance per unit surface area, which can be seen in region B in the load profile 70 of FIG. 6. The rate of change of the resistive load as a function of the penetration depth in region B of the load profile 70, therefore, is a compacted soil rate which corresponds to the shank point 34 traveling through the compaction layer 62 while increasing the penetration depth 38. The compacted soil rate is significantly larger than the non-compacted soil rate, due to the compaction layer 62 being significantly more dense than the unpacked soil layers 58 and 60, allowing the controller 52 to distinguish when the shank point 34 is within the compaction layer 62 based on the change in resistive load applied to the shank point 34 as a function of the change in penetration depth 38. As the penetration depth 38 of the shank point 34 continues to increase to the penetration depth 38 shown in FIG. 4, the change in the resistive load applied to the shank point 34 as a function of the change in the penetration depth 38 stays at the compacted soil rate until the deepest portion 66 of the shank point 34 penetrates the entire compaction thickness CT of the compaction layer 62 and enters the soil compaction boundary 64, as shown in region C of the load profile 70. Once the deepest portion 66 of the shank point 34 enters the soil compaction boundary 64, the rate of change in the resistive load applied to the shank point 34 as a function of the change in the penetration depth 38 can stay constant or decrease back to the non-compacted rate, since further increases in penetration depth 38 cause portions of the shank point 34 to travel through the non-compacted layer 60 with a resistive value which is less than that of the compaction layer 62.

Figure 8:
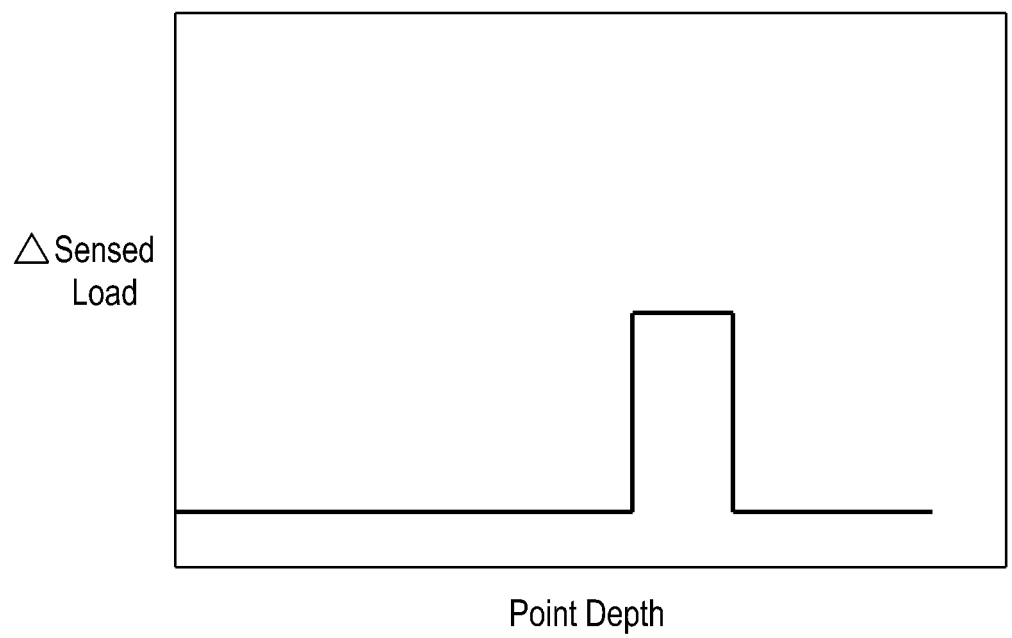
FIG. 8 is a chart illustrating a rate of a change in sensed load as a function of a change in point depth generated from the data in FIG. 7.

As shown in FIG. 4, the deepest portion 66 of the shank point 34 has gone excessively deep in the soil such that the friction on the shank 32 increases, due to a larger surface of the shank 32 being dug into the soil, past the point needed to remove the entire compaction layer 62. Further, the shank point 34 has gone so deep into the soil that the entirety of the shank point 34 is not engaging the compaction layer 62, which can increase the stress on the shank 32 and cause inefficient fracturing of the compaction layer 62. To adjust the penetration depth 38 of the shank point 34 so the deepest portion 66 of the shank point 34 resides in the soil compaction boundary 64 just below the compaction layer 62, the controller 52 can be configured to detect that the change in resistive load on the shank point 34 as a function of the change in penetration depth 38 has returned to the non-compacted soil rate from the compacted soil rate, indicating that the shank point 34 has entirely penetrated the compaction layer 62. Once the controller 52 has detected the rate change from the compacted soil rate to the non-compacted soil rate, the controller 52 can be configured to stop activation of the actuator 48 so the penetration depth 38 of the shank point 34 stops increasing and the deepest portion 66 of the shank point 34 is at the desired level in the soil. In the instance shown in FIG. 4 where the shank point 34 has actually gone through the entirety of the compaction layer 62 and is not entirely engaging the compaction layer 62, the controller 52 can be configured to activate the actuator 48 to decrease the penetration depth 38 of the shank point 34, as shown in FIG. 5, until the rate of change in the resistive load applied to the shank point 34 as a function of the penetration depth 38 returns to the compacted rate, at which point the controller 52 can activate the actuator 48 to slightly increase the penetration depth 38 of the shank point 34 so the deepest portion 66 of the shank point 34 resides in the soil compaction boundary 64. The rate of change of the resistive load on the shank point 34 as a function of the penetration depth is illustrated in FIG. 8.

Figure 7:
FIG. 7 is the chart of FIG. 6 after filtering.

Due to the nature of soil being fairly non-homogenous, the resistive load sensed by the load sensor 50 as the shank point 34 travels through the soil may be prone to spiking and frequent fluctuations, despite the shank point 34 traveling in only one of the soil layers 58, 60, 62 or 64. Further, the shank point 34 may encounter abnormal objects while traveling through the soil, such as a rock 80 shown in FIGS. 2-3, which causes a brief spike in the sensed resistive load, shown as region D in FIG. 6, that is not indicative of whether the shank point 34 is at the proper penetration depth. To accurately interpret the load profile 70, the controller 52 can be equipped with one or more filters (not shown) to produce a filtered load profile, as shown in FIG. 7. The filter(s) can be hardware, e.g., a part of the controller 52, and/or software based, as is known in the art. The filter(s) can be configured, for example, as a hardware filter that prevents any abnormally high resistive load signals, such as the spike shown in FIG. 6, from being included in the load profile 70 and analyzed by the controller 52 to prevent the controller 52 from erroneously determining the rate of change of the resistive load as a function of a change in the penetration depth to be at the compacted soil rate. In other words, the controller 52 can be configured to ignore a change in the shank load signal as a function of a change in a received point depth signal which exceeds an abnormality rate correlating to an abnormally high rate that is generated when the shank point 34 encounters, for example, the rock 80. The abnormality rate can be chosen to be a rate which is significantly greater than the compacted soil rate so the controller 52 does not ignore the instances when the shank point 34 enters the compaction layer 62. To reduce the noise caused by the non-homogeneity of the soil, the controller 52 can also be configured to average out the sensed load signals in the load profile 70 over a time and/or depth change interval to account for the minor fluctuations in the sensed load that will occur as the shank point 34 travels through the soil. While not necessarily needed in order for the controller 52 to function properly, filtering out the fluctuations caused by the non-homogeneity of the soil can better condition the load profile 70 for analysis by a user compared to the raw data that is collected and shown in FIG. 6. It should thus be appreciated that the raw data collected by the load sensor 50 can be filtered in a variety of ways by the controller 52, and the previously described ways are exemplary only.

Figure 9:
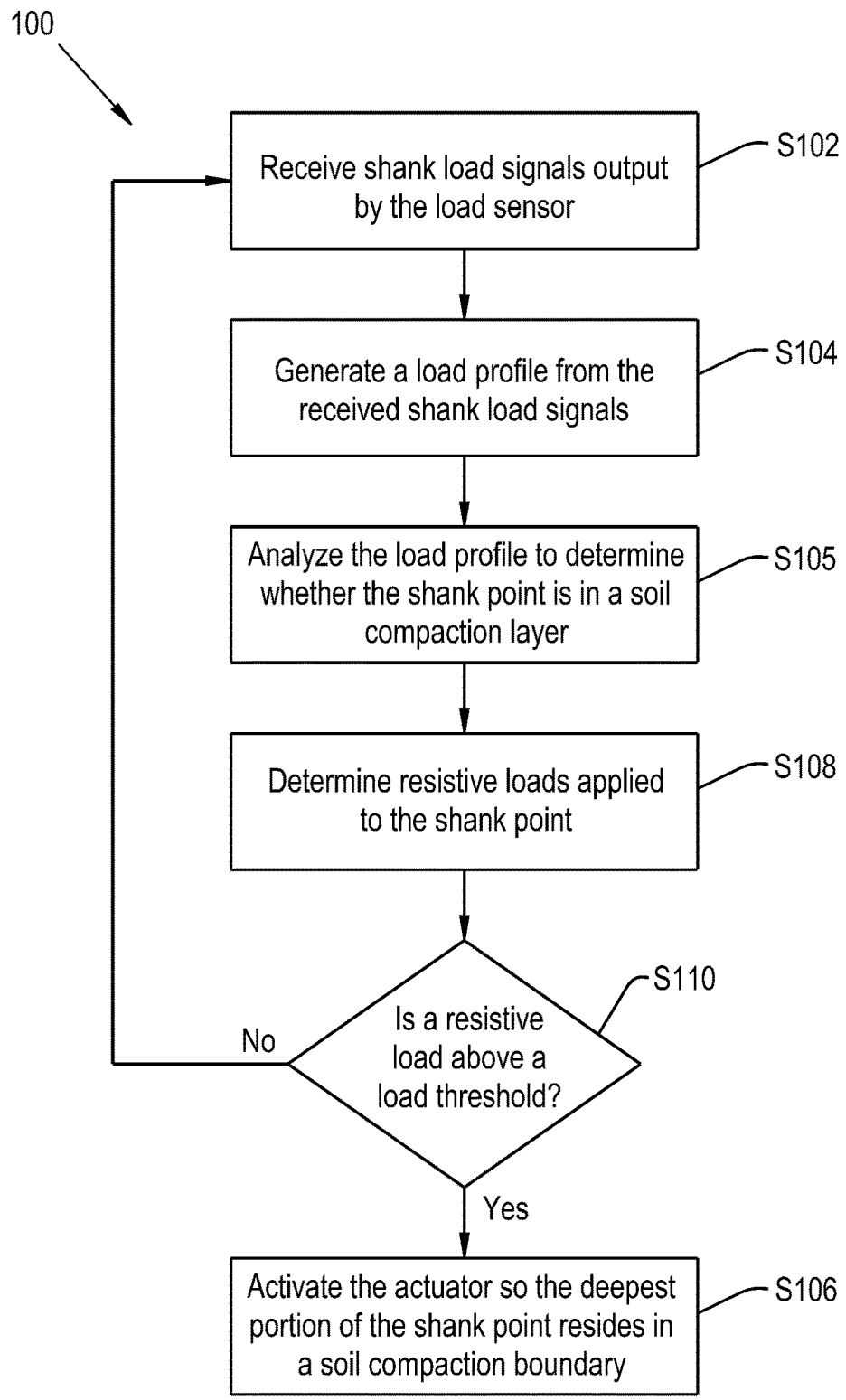
FIG. 9 is a flowchart illustrating operation of a controller of the agricultural implement according to an exemplary method of the present invention.

Referring now to FIG. 9, operation of the controller 52 according to an exemplary embodiment of a method 100 of the present invention is shown. The controller 52 receives S102 shank load signals output by the load sensor 50 to generate S104 the load profile 70 from the received shank load signals. The controller 52 then analyzes S105 the load profile 70 to determine whether the shank point 34 is in a soil compaction layer 62. Depending on the result of the analysis S105, the controller 52 may activate S106 the actuator 48 to increase the penetration depth 38 of the shank point 34 so the deepest portion 66 of the shank point 34 resides in the soil compaction boundary 64 below the soil compaction layer 62, allowing the shank point 34 to fracture the entire soil compaction layer 62 as the implement 20 travels in the forward direction 40. To determine whether the shank point 34 is in a soil compaction layer 62 or not, the controller 52 can be configured to analyze the load profile 70 to determine S108 resistive loads applied to the shank point 34 and determine S110 whether the resistive loads applied to the shank point 34 are at certain load threshold levels 72, 74. Once the determined resistive loads reach a load threshold 74 indicating the shank point 34 resides within the soil compaction boundary 64, the controller 52 can be configured to stop activation S106 of the actuator 48.

Figure 10:
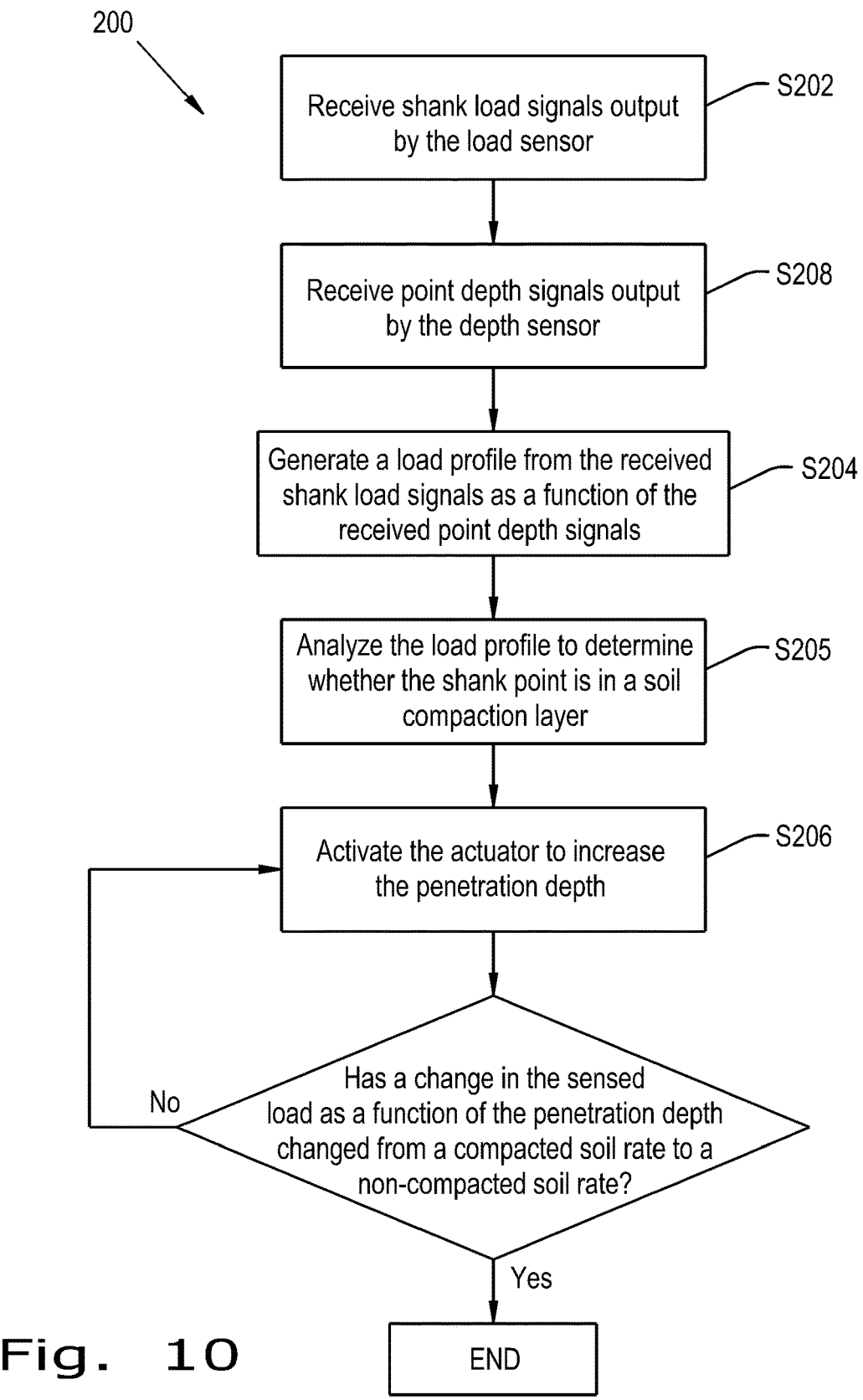
FIG. 10 is a flowchart illustrating operation of a controller of the agricultural implement according to another exemplary method of the present invention.

Referring now to FIG. 10, operation of the controller 52 according to another exemplary embodiment of a method 200 of the present invention is shown. The method 200 is similar to the method 100 shown in FIG. 9 and previously described, with similar elements being given reference numerals raised by 100. As can be seen, the method 200 includes the controller 52 receiving S202 shank load signals output by the load sensor 50 to generate S204 the load profile 70 from the received shank load signals. The controller 52 then analyzes S205 the load profile 70 to determine whether the shank point 34 is in a soil compaction layer 62. Depending on the result of the analysis S205, the controller 52 may activate S206 the actuator 48 to increase the penetration depth 38 of the shank point 34 so the deepest portion 66 of the shank point 34 resides in the soil compaction boundary 64 below the soil compaction layer 62, allowing the shank point 34 to fracture the entire soil compaction layer 62 as the implement 20 travels in the forward direction 40. Unlike the method 100 previously shown and described, the method 200 has the controller 52 also receive S208 point depth signals from a depth sensor 54 which is associated with the shank point 34 to generate S204 the load profile from the received shank load signals as a function of the received point depth signals. To determine whether the shank point 34 is in a soil compaction layer 62, the controller 52 can determine when a change in a received shank load signal as a function of a change in a received point depth signal raises from a non-compacted soil rate to a compacted soil rate, indicating that further increases in the penetration depth 38 are occurring as the shank point 34 penetrates the compaction layer 62. Once the change in the received shank load signal as a function the change in the received point depth signal raises to the compacted soil rate, the controller 52 can continue to activate S206 the actuator 48 until the rate changes from the compacted soil rate back to the non-compacted soil rate, indicating that the shank point 34 has completely penetrated the compaction layer 62 and the deepest portion 66 of the shank point 34 resides in the soil compaction boundary 64. It should be appreciated that, rather than the penetration depth 38 of the shank point 34, the controller 52 can be configured to generate a load profile and analyze the generated load profile as a function of other inputs that change when fracturing the soil compaction layer 62, such as the vibrational amplitude and/or frequency of the shank 34 detected by the vibration sensor 56.

It is to be understood that the steps of the methods 100 and 200 are performed by the controller 52 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 52 described herein, such as the methods 100 and 200, is implemented in software code or instructions which are tangibly stored on a tangible computer readable medium. Upon loading and executing such software code or instructions by the controller 52, the controller 52 may perform any of the functionality of the controller 52 described herein, including any steps of the methods 100 and 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement, comprising:
    a chassis;
    an implement frame carried by said chassis;
    a shank connected to said implement frame, said shank including a shank point configured to break apart soil and a load sensor associated with said shank point which is configured to output shank load signals as said shank point advances through soil;
    an actuator carried by said chassis and configured to adjust a depth of said shank point; and
    a controller electrically coupled to said load sensor and said actuator, said controller configured to:
        receive said shank load signals;
        generate a load profile from said received shank load signals;
        analyze said load profile to determine whether said shank point is in a soil compaction layer; and
        activate said actuator to adjust said depth of said shank point based on said analyzed load profile;
    further comprising a depth sensor associated with said shank point and configured to output point depth signals, said controller being electrically coupled to said depth sensor and configured to receive said point depth signals;
    wherein said controller is configured to generate said load profile from said received shank load signals as a function of said received point depth signals.

2. The agricultural implement according to claim 1, wherein said controller is configured to activate said actuator so said deepest portion of said shank point resides in a soil compaction boundary below a soil compaction layer.

3. The agricultural implement according to claim 1, wherein said controller is configured to analyze said load profile to determine resistive loads applied to said shank point.

4. The agricultural implement according to claim 3, wherein said controller is configured to activate said actuator until said resistive loads applied to said shank point reach a load threshold.

5. The agricultural implement according to claim 1, wherein said controller is configured to determine said shank point is in a soil compaction layer when a change in a received shank load signal as a function of a received point depth signal raises from a non-compacted soil rate to a compacted soil rate.

6. The agricultural implement according to claim 5, wherein said controller is configured to activate said actuator to increase said depth of said shank point until a change in a received shank load signal as a function of a received point depth signal returns to said non-compacted soil rate from said compacted soil rate.

7. The agricultural implement according to claim 5, wherein said controller is configured to ignore a change in a received shank load signal as a function of a received point depth signal exceeding an abnormality rate.

8. The agricultural implement according to claim 1, wherein said actuator includes said depth sensor.

9. A method for controlling a penetration depth of a shank point of an agricultural implement having a load sensor associated with said shank point, comprising:
    determining a resistive load applied to said shank point from shank load signals output by said load sensor as said agricultural implement travels;
    generating a load profile from said output shank load signals;
    analyzing said load profile; and
    activating an actuator of said agricultural implement to adjust said penetration depth of said shank point based on said analyzed load profile;
    wherein said agricultural implement comprises a depth sensor associated with said shank point which outputs point depth signals;
    determining penetration depths of said shank point from said point depth signals, wherein said load profile is generated from said determined resistive loads applied to said shank point as a function of said determined penetration depths.

10. The method according to claim 9, further comprising determining whether said shank point is in a soil compaction layer, wherein said activating occurs until a deepest portion of said shank point resides in a soil compaction boundary below a soil compaction layer.

11. The method according to claim 9, wherein said activating occurs until said determined resistive load reaches a load threshold.

12. The method according to claim 9, wherein said shank point is determined to be in a soil compaction layer when a change in a determined resistive load applied to said shank point as a function of a determined penetration depth raises from a non-compacted soil rate to a compacted soil rate.

13. The method according to claim 12, wherein said activating occurs until a change in a determined resistive load applied to said shank point as a function of a determined penetration depth returns to said non-compacted soil rate from said compacted soil rate.

14. An agricultural implement, comprising:
a chassis;
an implement frame carried by said chassis;
a shank connected to said implement frame, said shank including a shank point configured to break apart soil and a load sensor associated with said shank point which is configured to output shank load signals as said shank point advances through soil;
an actuator carried by said chassis and configured to adjust a depth of said shank point;
and
a controller electrically coupled to said load sensor and said actuator, said controller configured to:
receive said shank load signals;
generate a load profile from said received shank load signals;
analyze said load profile to determine whether said shank point is in a soil compaction layer; and
activate said actuator to adjust said depth of said shank point based on said analyzed load profile;
further comprising a depth sensor associated with said shank point and configured to output point depth signals, said controller being electrically coupled to said depth sensor and configured to receive said point depth signals;
wherein said actuator includes said depth sensor.

* * * * *